(12) United States Patent
Hecht (10) Patent No.: US 8,647,029 B2
(45) Date of Patent: Feb. 11, 2014

(54) CUTTING TOOL AND METHOD FOR EXTRACTING CUTTING INSERT THEREFROM

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 142 days.

(21) Appl. No.: 13/425,185

(22) Filed: Mar. 20, 2012

(65) Prior Publication Data
US 2013/0170918 A1  Jul. 4, 2013

Related U.S. Application Data (60) Provisional application No. 61/582,763, filed on Jan. 3, 2012.

(51) Int. Cl.
*B23C 5/02* (2006.01)
*B23C 5/22* (2006.01)

(52) U.S. Cl.
USPC ............................ 407/110; 407/107; 407/109

(58) Field of Classification Search
USPC .................... 407/107, 110, 109, 117
See application file for complete search history.

(56) References Cited

U.S. PATENT DOCUMENTS

| | | | |
|---|---|---|---|
| 195,699 A | 10/1877 | Burger | |
| 4,580,930 A | 4/1986 | Zinner | |
| 4,588,333 A | 5/1986 | Gustafson | |
| 4,938,640 A * | 7/1990 | Pano et al. | 407/110 |
| 5,085,541 A * | 2/1992 | Simpson, III | 407/110 |
| 5,156,502 A * | 10/1992 | Satran | 407/110 |
| 5,795,109 A | 8/1998 | Jonsson et al. | |
| 6,454,498 B1 | 9/2002 | Hansson et al. | |
| 6,565,292 B2 * | 5/2003 | Hecht | 407/110 |
| 7,331,096 B2 | 2/2008 | Kugler et al. | |
| 7,524,147 B2 | 4/2009 | Hecht | |
| 2002/0081165 A1 | 6/2002 | Hecht | |
| 2006/0062640 A1 | 3/2006 | Kugler et al. | |
| 2010/0061814 A1 | 3/2010 | Hecht | |

FOREIGN PATENT DOCUMENTS

| | | |
|---|---|---|
| DE | 7415774 U | 8/1975 |
| JP | 2000 343304 | 12/2000 |

OTHER PUBLICATIONS

Search Report dated Mar. 19, 2013 issued in PCT counterpart application (No. PCT/IL2012/050509).

\* cited by examiner

*Primary Examiner* — Will Fridie, Jr.
(74) *Attorney, Agent, or Firm* — Womble Carlyle (57) ABSTRACT

A cutting tool used for grooving and turning has a cutting insert removably secured in a holder blade. The cutting insert includes an insert passage having an insert passage axis, and the holder blade includes a holder passage having holder passage axis. When the cutting insert is resiliently clamped in the holding portion and located in a rearmost position, a passage plane containing the holder and insert passage axes forms a first angle with a main plane, perpendicular to the insert longitudinal axis and containing the insert passage center point, where the first angle is less than or equal to 60°. The cutting insert can be extracted from the cutting tool by positioning first and second engagement portions of an extraction key simultaneously in the holder and insert passages, respectively, and rotating the extraction key.

26 Claims, 5 Drawing Sheets

CUTTING TOOL AND METHOD FOR EXTRACTING CUTTING INSERT THEREFROM

RELATED APPLICATIONS

This application claims priority to U.S. Provisional Patent Application No. 61/582,763, filed 3 Jan. 2012, whose contents are incorporated by reference in their entirety.

FIELD OF THE INVENTION

The subject matter of the present application relates to grooving and parting cutting tools of the type in which a cutting insert is removably secured in a holder blade by means of a resilient clamping force.

BACKGROUND OF THE INVENTION

Cutting tools for grooving and parting where a cutting insert is removably secured in a holder blade by means of a resilient clamping force can be extracted from the holder blade with the aid of a key.

An example of such a clamping mechanism is disclosed in U.S. Pat. No. 7,524,147.

Examples of such cutting inserts and keys are disclosed in U.S. Pat. No. 7,331,096, U.S. Pat. No. 5,795,109, U.S. Pat. No. 6,454,498 and U.S. Pat. No. 6,565,292.

It is an object of the subject matter of the present application to provide a cutting tool having an improved means of resiliently clamping a cutting insert in an insert receiving pocket of a holder blade.

It is also an object of the subject matter of the present application to provide a cutting tool with an improved means of extracting the cutting insert from the holder blade.

SUMMARY OF THE INVENTION

In accordance with the subject matter of the present application, there is provided a cutting tool comprising a holder blade and a cutting insert resiliently clamped in the holder blade, the holder blade having a body portion and a holding portion, the holding portion having two opposing side surfaces and comprising:
an insert receiving slot opening out to a holder front end surface of the holder blade and having a holder longitudinal axis extending in a forward to rearward direction, and
a holder passage extending along a holder passage axis and opening out to at least one of the two side surfaces, the holder passage axis containing a holder passage centre point;
wherein
the insert receiving slot has a base jaw lower surface facing in an upward direction, the base jaw lower surface including at least one longitudinally extending base jaw clamping portion, each base jaw clamping portion containing a linear holder imaginary line parallel to the holder longitudinal axis;
the holder passage centre point is located downwardly from the base jaw lower surface;
the cutting insert has an insert longitudinal axis parallel to the holder longitudinal axis and comprises;
opposing insert upper and lower surfaces with a peripheral surface extending therebetween and a cutting edge associated with the insert upper surface, the peripheral surface comprising two opposing lateral surfaces; and
an insert passage extending along an insert passage axis and opening out to the opposing lateral surfaces, the insert passage axis containing an insert passage centre point; wherein
the insert lower surface includes at least one longitudinally extending lower clamping portion, each lower clamping portion containing a linear insert imaginary line parallel to the insert longitudinal axis;
the at least one lower clamping portion is in clamping contact with the at least one base jaw clamping portion and the cutting insert is located in a rearmost position in the insert receiving slot;
a passage plane containing the holder passage axis and the insert passage axis forms a first angle with a main plane perpendicular to the insert longitudinal axis and containing the insert passage axis; and
the first angle is less than or equal to 60°.

Also in accordance with the subject matter of the present application, there is provided a method of extracting a cutting insert from a cutting tool by means of an extraction key; wherein
the insert receiving slot includes a clamping jaw upper surface facing towards the base jaw lower surface;
the cutting insert is resiliently clamped between the clamping jaw upper surface and the base jaw lower surface; and
the extraction key has at least one protrusion, the at least one protrusion including a first and a second engagement portion and a single pivot axis;
the method comprising the steps of:
positioning the extraction key relative to the cutting tool such that the first and second engagement portions simultaneously engage the holder passage and the insert passage, respectively, and the pivot axis is located in the holder passage; and
rotating the extraction key in one direction about the pivot axis to apply an extraction force on the cutting insert in the forward direction.

Also in accordance with the subject matter of the present application, there is provided a cutting tool comprising a holder blade and a cutting insert resiliently clamped in the holder blade, wherein:
the holder blade comprises a body portion and a holding portion, the holding portion comprising:
two opposing side surfaces and a holder front end surface;
an insert receiving slot opening out to the holder front end surface, the insert receiving slot having a base jaw lower surface including at least one longitudinally extending base jaw clamping portion; and
a holder passage extending along a holder passage axis and opening out to at least one of the two side surfaces, the holder passage axis containing a holder passage centre point which is below the base jaw lower surface in a side view of the holder blade; and
the cutting insert comprises:
opposing insert upper and lower surfaces with a peripheral surface extending therebetween and a cutting edge associated with the insert upper surface, the peripheral surface comprising two opposing lateral surfaces, the insert lower surface including at least one longitudinally extending lower clamping portion; and
an insert passage extending along an insert passage axis and opening out to the opposing lateral surfaces, the insert passage axis containing an insert passage centre point;

the cutting insert is located in a rearmost position in the insert receiving slot;

the at least one lower clamping portion is in clamping contact with the at least one base jaw clamping portion defining an assembled state, whereby the cutting insert and the holder blade form an imaginary border line, in a side view of the cutting tool;

a passage plane containing the holder passage axis and the insert passage axis forms a first angle with a main plane containing the insert passage axis and perpendicular to the imaginary border line; and the first angle is less than or equal to 60°.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
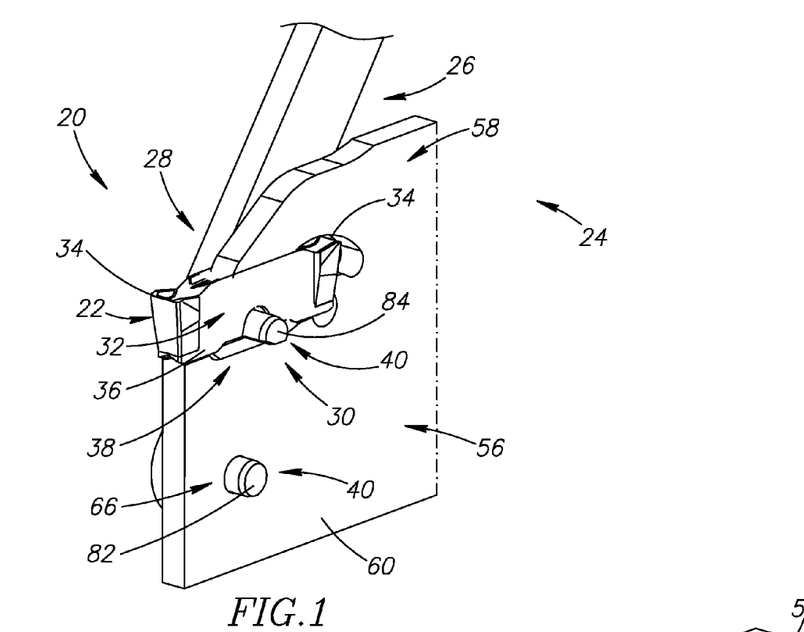
FIG. 1 is a perspective view of a cutting tool in accordance with a first embodiment of the present application, having a key engaged.
Figure 2:
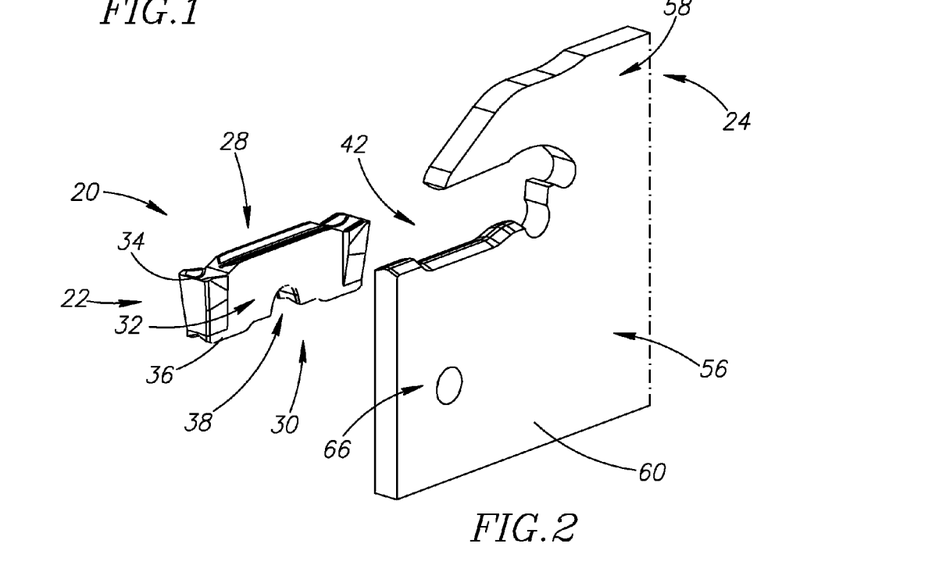
FIG. 2 is an exploded perspective view of the cutting tool shown in FIG. 1.

Attention is first drawn to FIGS. 1 and 2 showing a cutting tool 20 of the type used for grooving or parting operations, in accordance with a first embodiment of the subject matter of the present application. The cutting tool 20 has a cutting insert 22 having an insert longitudinal axis A and a holder blade 24 having a holder longitudinal axis B where the cutting insert 22 can be secured in the holder blade 24 by means of a clamping force and can be extracted from the cutting tool 20 by the rotation of an extraction key 26.

Figure 3:
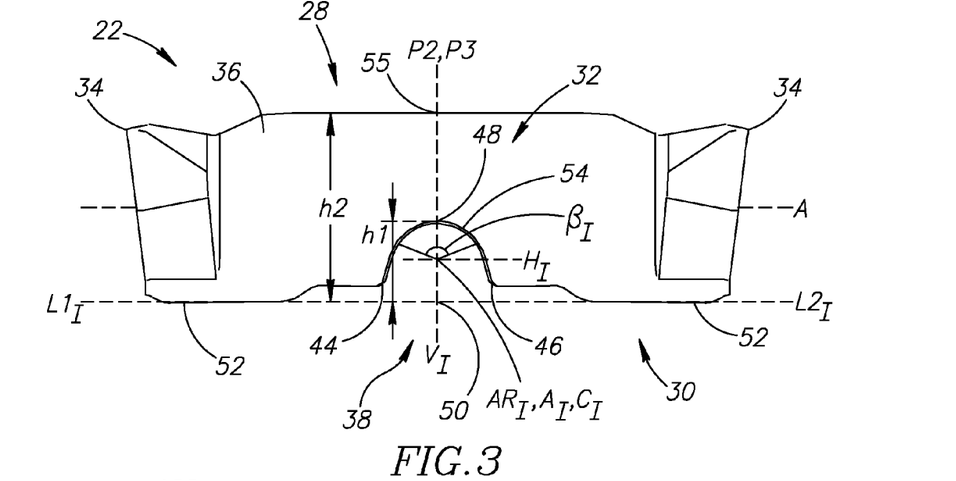
FIG. 3 is a side view of a cutting insert shown in FIGS. 1 and 2.
Figure 4:
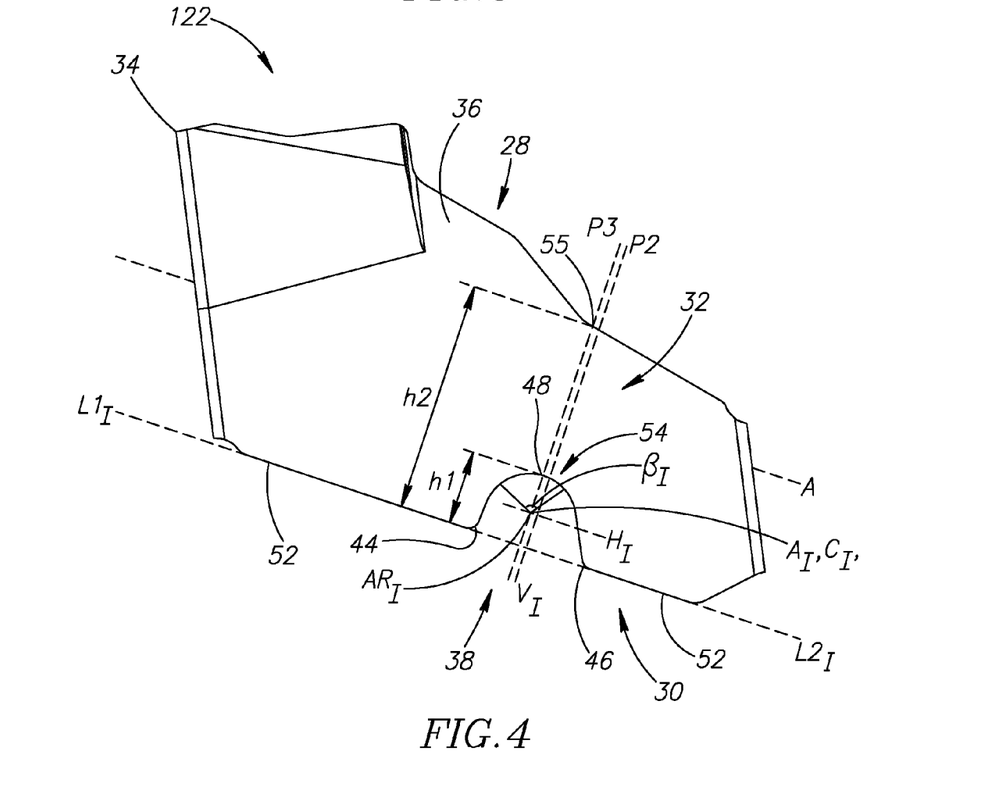
FIG. 4 is a side view of a cutting insert in accordance with a second embodiment of the present application.

Reference is now made to FIGS. 3 and 4. The cutting insert 22, 122 has opposing insert upper and lower surfaces 28, 30 with a peripheral surface 32 extending therebetween. A cutting edge 34 is associated with the insert upper surface 28. The peripheral surface 32 has two opposing lateral surfaces 36.

The insert lower surface 30 includes at least one longitudinally extending lower clamping portion 52, where each lower clamping portion 52 contains an associated linear insert imaginary line $L1_I$, $L2_I$ parallel to the insert longitudinal axis A. In accordance with some embodiments of the subject matter of the present application the insert lower surface 30 may have two lower clamping portions 52, and the two respective linear insert imaginary lines $L1_I$, $L2_I$ may be co-axial.

An insert passage 38 extends along an insert passage axis $A_I$ and opens out to the opposing lateral surfaces 36. The purpose of the insert passage 38 is to provide a means for a protrusion 40 of the extraction key 26 to engage the cutting insert 22, 122 in order that an extraction force $F_E$ can be applied so that the cutting insert 22, 122 can be extracted from an insert receiving slot 42 by rotation of the extraction key 26.

In accordance with some embodiments of the subject matter of the present application, the insert passage 38 may open out to the insert lower surface 30. In accordance with other embodiments of the subject matter of the present application (not shown) the insert passage 38 may not open out to the insert lower surface 30. In such a configuration the insert passage 38 opens out completely on to the lateral surfaces 36. (i.e., the openings of the insert passage 38 are surrounded by the lateral surfaces 36).

The insert passage axis $A_I$ contains an insert passage centre point $C_I$. It should be appreciated that use of the term "insert passage centre point $C_I$" throughout the description and claims refers to the point of intersection between insert horizontal and vertical straight lines $H_I$, $V_I$ bisecting the insert passage 38 in a side view of the cutting insert 22, 122, the horizontal line $H_I$ being parallel to the insert longitudinal axis A and the vertical line $V_I$ being perpendicular to the horizontal line $H_I$. The vertical line $V_I$ is located midway between insert passage forwardmost and rearwardmost points 44, 46 of the insert passage 38. It should be appreciated that use of the terms "forward" and "rearward" throughout the description and claims refer to a relative position in a direction of the insert and holder longitudinal axis A, B generally towards the left and right, respectively, in FIGS. 3 to 10.

In some embodiments of the present invention, where the insert passage 38 opens out to the insert lower surface 30, the horizontal line $H_I$ is located midway between an insert passage upwardmost point 48 of an insert passage 38 and the downwardmost linear insert imaginary line $L1_I$, $L2_I$. In other embodiments (not shown), the horizontal line $H_I$ is located midway between the insert passage upwardmost and downwardmost points 48, 50 of the insert passage 38. It should also be appreciated that use of the terms "upward" and "downward" throughout the description and claims refer to a relative position in a direction perpendicular to the insert and holder longitudinal axis A, B generally towards the top and bottom, respectively, in FIGS. 3 to 10.

In accordance with some embodiments of the subject matter of the present application there may be exactly one insert passage 38. The insert passage 38 may include an insert curved portion 54 having a substantially constant radius subtending an insert passage angle $β_I$. In such a configuration the insert passage angle $β_I$ may be greater than 90°. It should be noted that a radial centre axis $AR_I$ of the insert curved portion 54 may not be necessarily co-axial with the insert passage axis $A_I$.

A main plane P2 oriented perpendicularly to the insert longitudinal axis A contains the insert passage axis $A_I$. In accordance with some embodiments of the subject matter of the present application the cutting insert 22, 122 may exhibit minor symmetry about the main plane P2.

A third plane P3 that is coplanar with or parallel to the main plane P2, contains the insert passage upwardmost point 48 and intersects the insert upper surface 28 at an intersection point 55, in a side view of the cutting insert.

In accordance with some embodiments of the subject matter of the present application, in a side view of the cutting tool 20, 120 and measured in the third plane P3, a passage height h1 between the insert passage upwardmost point 48 on the insert passage 38 and the downwardmost insert imaginary line $L1_I$, $L2_I$ is at least one quarter the magnitude of an insert height h2 between the intersection point 55 and the downwardmost insert imaginary line $L1_I$, $L2_I$. (i.e., the maximum height of the insert passage 38 may be at least one quarter the height of the cutting insert 22, 122, when measured at the third plane P3.

Figure 5:
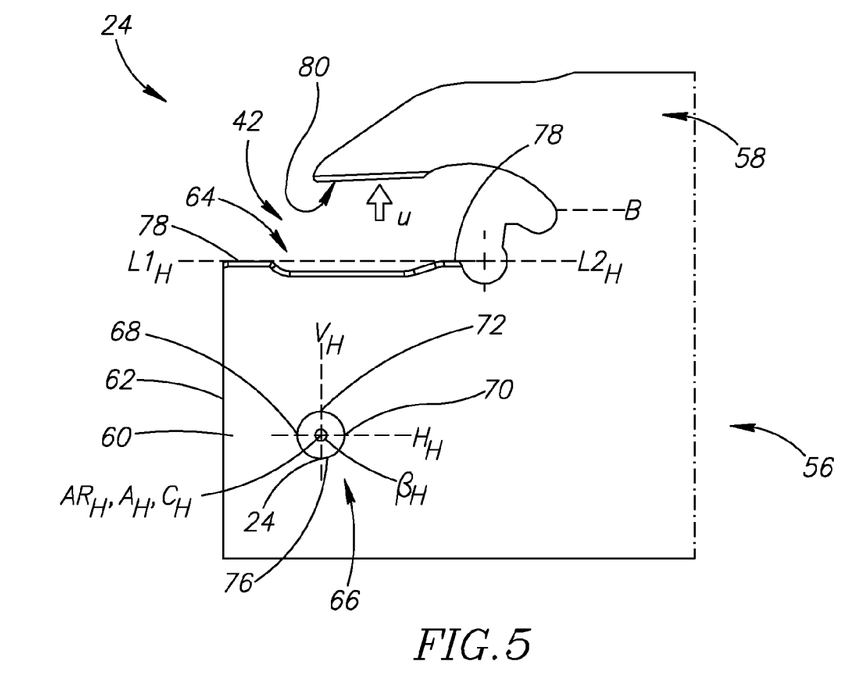
FIG. 5 is a side view of a holder blade shown in FIGS. 1 and 2.
Figure 6:
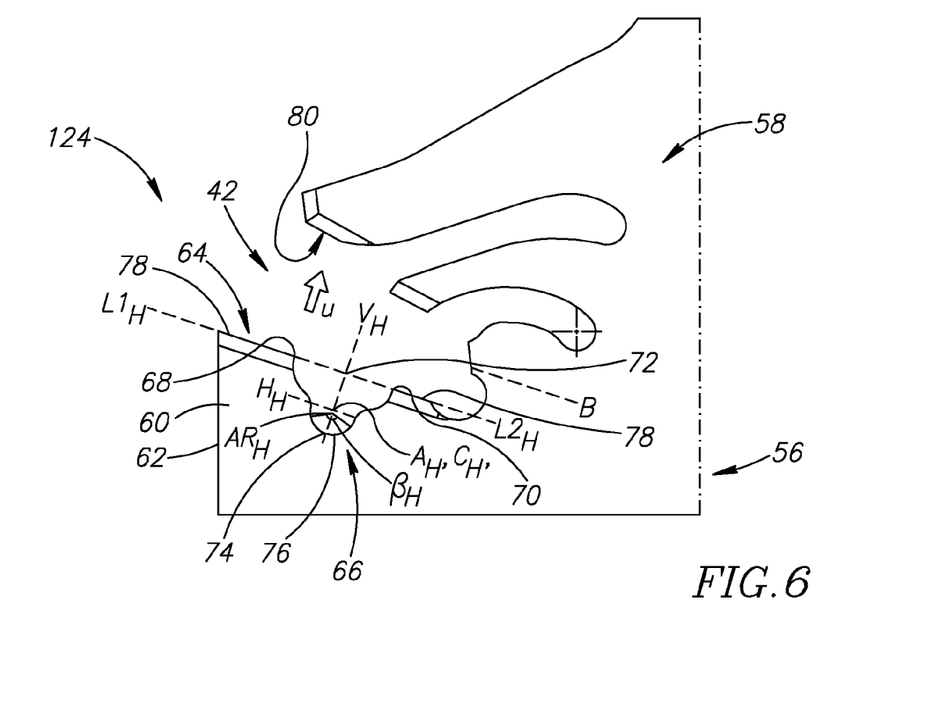
FIG. 6 is a side view of a holder blade in accordance with the second embodiment of the present application.

Now referring to FIGS. 5 and 6, the holder blade 24, 124 has a body portion 56 and a holding portion 58. The holding portion 58 has two opposing side surfaces 60, and includes the insert receiving slot 42 that opens out to a holder front end surface 62 of the holder blade 24, 124. The insert receiving slot 42 has a base jaw lower surface 64 facing in an upward direction U. The holder longitudinal axis B extends in a forward to rearward direction $D_F$, $D_R$. A holder passage 66 extends along a holder passage axis $A_H$ and opens out to at least one of the two side surfaces 60. In accordance with some embodiments of the subject matter of the present application the holder passage 66 may extend between, and may open out to, both the side surfaces 60.

In accordance with some embodiments of the subject matter of the present application, the holder passage 66 may open out to the base jaw lower surface 64. In accordance with other embodiments of the subject matter of the present application the holder passage 66 may not open out to the base jaw lower surface 64. In such a configuration the holder passage 66 opens out completely on to at least one of the side surfaces 60. (i.e., the openings of the holder passage 66 are surrounded by the side surfaces 60).

The holder passage axis $A_H$ contains a holder passage centre point $C_H$. The holder passage centre point $C_H$ is located downwardly from the base jaw lower surface 64. It should be appreciated that use of the term "holder passage centre point $C_H$" throughout the description and claims refers to the point of intersection between holder horizontal and vertical straight lines $H_H$, $V_H$ bisecting the holder passage 66 in a side view of the holder blade 24, 124, the holder horizontal line $H_H$ being parallel to the holder longitudinal axis B and the holder vertical line $V_H$ being perpendicular to the horizontal line $H_H$. The vertical line $V_H$ is located midway between holder passage forwardmost and rearwardmost points 68, 70 of the holder passage 66.

In some embodiments of the present invention, where the holder passage 66 opens out to the base jaw lower surface 64, the horizontal line $H_H$ is located midway between the holder passage downwardmost point 74 of the holder passage 66 and the upwardmost linear holder imaginary line $L1_H$, $L2_H$. In other embodiments, where the holder passage 66 opens out completely on to the side surfaces 60, the horizontal line $H_H$ is located midway between the holder passage upwardmost and downwardmost points 72, 74 of the holder passage 38.

In accordance with some embodiments of the subject matter of the present application the holder passage 66 may include a holder curved portion 76 having a substantially constant radius subtending a holder passage angle $\beta_H$. The holder passage angle $\beta_H$ may be greater than 90°. The holder passage 66 may be circular in a side view of the cutting tool 20, 120. It should be noted that a radial centre axis $AR_H$ of the holder curved portion 76 is not necessarily co-axial with the holder passage axis $A_H$.

The base jaw lower surface 64 includes at least one longitudinally extending base jaw clamping portion 78, where each base jaw clamping portion 78 contains a linear holder imaginary line $L1_H$, $L2_H$ parallel to the holder longitudinal axis B.

In accordance with some embodiments of the subject matter of the present application the base jaw lower surface 64 may have two base jaw clamping portions 78, and the two respective linear holder imaginary line $L1_H$, $L2_H$ may be co-axial.

Figure 7:
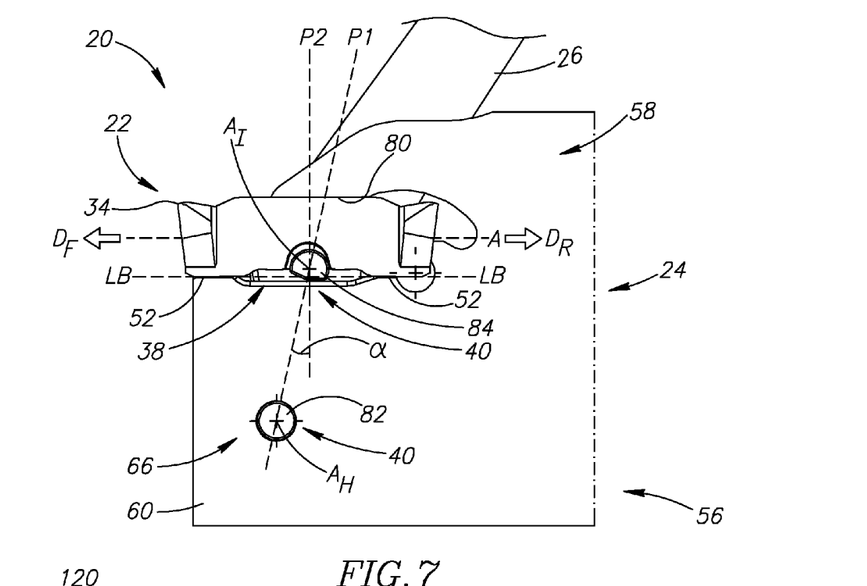
FIG. 7 is a side view of the cutting tool shown in FIG. 1 with the cutting insert located in a clamped position.
Figure 8:
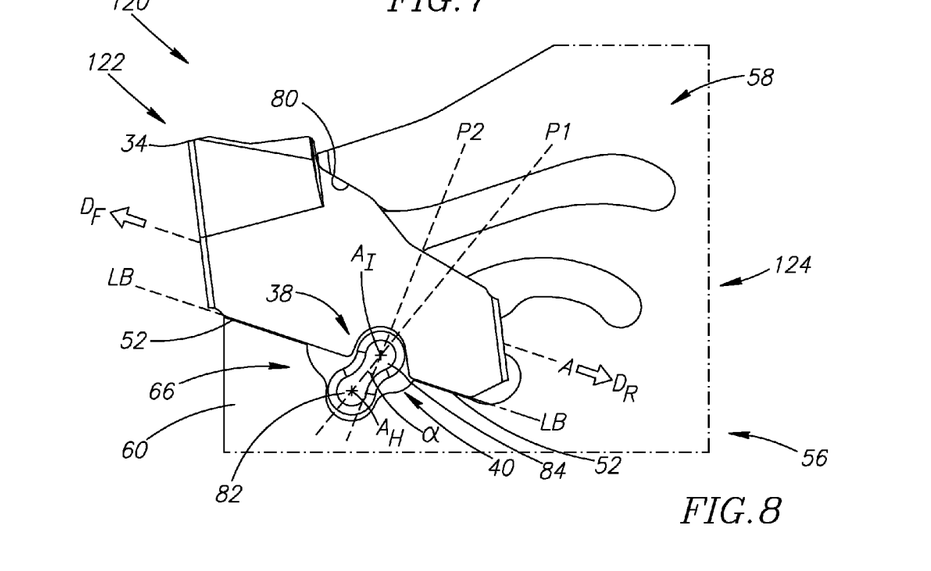
FIG. 8 is a side view of a cutting tool, in accordance with a second embodiment of the present application, with the cutting insert located in a clamped position.

Now referring to FIGS. 7 and 8, the at least one lower clamping portion 52 is in clamping contact with the at least one base jaw clamping portion 78 (i.e., in the clamped position) and the cutting insert 22, 122 is located in a rearmost position in the insert receiving slot 42, defining an assembled state. When in the assembled state, the cutting tool 20, 120 is ready for performing cutting operations. Due to the clamping contact between the insert's lower clamping portion 52 and the holder blade's base jaw clamping portion 78, the cutting insert 22, 122 and the holder blade 24, 124 form an imaginary border line LB where the cutting insert and the holder blade appear to meet, in a side view of the cutting tool 20, 120. It is understood, however, that the insert's lower clamping portion 52 and the holder blade's base jaw clamping portion 78 are typically provided with complementary surfaces, such as mating V-shaped grooves, and so the imaginary border line LB does not necessarily represent the location of an actual abutment interface between the cutting insert and the holder blade. As seen in FIGS. 7 and 8, the main plane P2 is perpendicular to the imaginary border line LB.

A passage plane P1 that contains the holder passage and insert passage axes $A_H$, $A_I$ forms a first angle α with the main plane P2, and the first angle α is less than or equal to 60°. The holder longitudinal axis B is parallel to the insert longitudinal axis A.

In accordance with some embodiments of the subject matter of the present application the first angle α may be less than or equal to 30°. The holder passage axis $A_H$ may be forward of the insert passage axis $A_I$.

In accordance with the second embodiment of the subject matter of the present application (FIG. 8) the main plane P2 may intersect the holder passage 66, and both the insert and holder passages 38, 66 may open out to their respective insert lower surface 30 and the base jaw lower surface 64. Such a configuration allows the use of the extraction key 26 with only one protrusion 40.

The insert receiving slot 42 may include a clamping jaw upper surface 80 facing towards the base jaw lower surface 64, and the cutting insert 22, 122 may be resiliently clamped between the clamping jaw upper surface 80 and the base jaw lower surface 64.

In accordance with some embodiments of the subject matter of the present application, in the assembled state the insert passage 38 and the holder passage 66 can be unoccupied. Moreover, also in the assembled state, the insert passage 38 and the holder passage 66 may be non-contiguous at the insert passage forwardmost point 44 and the holder passage forwardmost point 68. The holder passage forwardmost point 68 can be located forward of the insert passage forwardmost point 44.

Another aspect of the subject matter of the present application includes a method of extracting the cutting insert 22, 122 from the cutting tool 20, 120 by means of the extraction key 26. That is to say, adjusting the cutting insert 22, 122 from a clamped position to a released position. Reference is made to FIGS. 7 to 10. The insert receiving slot 42 includes a clamping jaw upper surface 80 facing towards the base jaw lower surface 64 and the cutting insert 22, 122 is resiliently clamped between the clamping jaw upper surface 80 and the base jaw lower surface 64. The extraction key 26 has at least one protrusion 40, the at least one protrusion 40 including a first and second engagement portion 82, 84 and a single pivot axis $A_P$. The extraction key 26 is positioned relative to the cutting tool 20, 120 such that the first and second engagement portions 82, 84 simultaneously engage the holder passage 66 and the insert passage 38, respectively, and the pivot axis $A_P$ is located in the holder passage 66. The extraction key 26 is rotated in one direction about the pivot axis $A_P$ to apply the extraction force $F_E$ on the cutting insert 22, 122 in the forward direction $D_F$.

After the first and second engagement portions 82, 84 are positioned in the holder and insert passages 66, 38 respectively, at least one of the holder and insert passages 66, 38 provides freedom for at least one of the first and second engagement portions 82, 84 to be displaced in the direction parallel to the passage plane P1, such that no resistive downward force is encountered by the second engagement portion 84 located in the insert passage 38 during the rotating of the extraction key 26.

Figure 9:
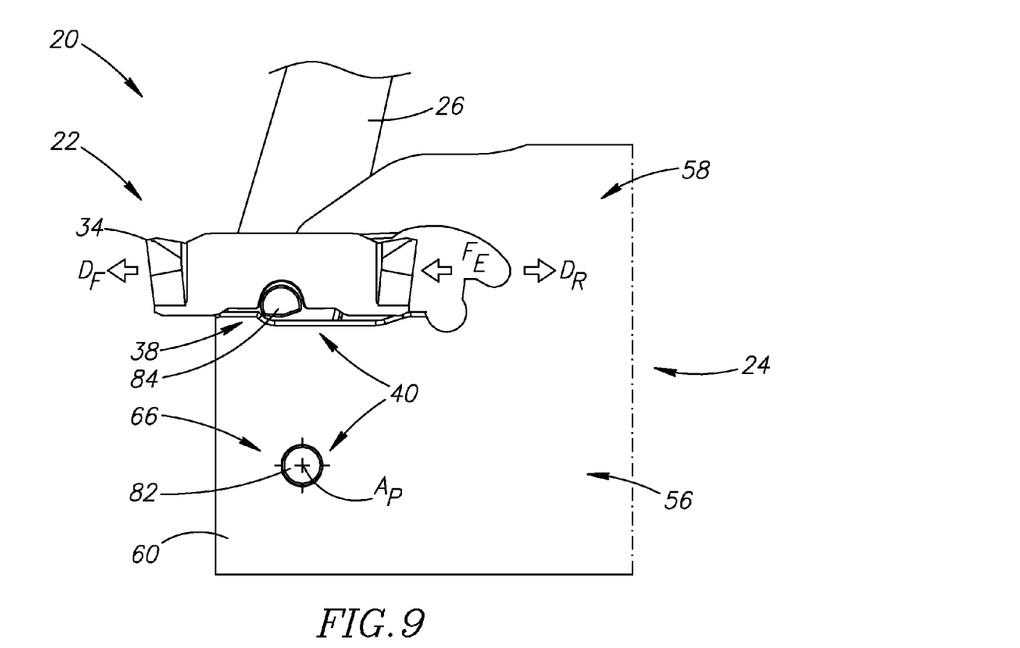
FIG. 9 is a side view of the cutting tool shown in FIG. 1 with the cutting insert located in a released position.
Figure 10:
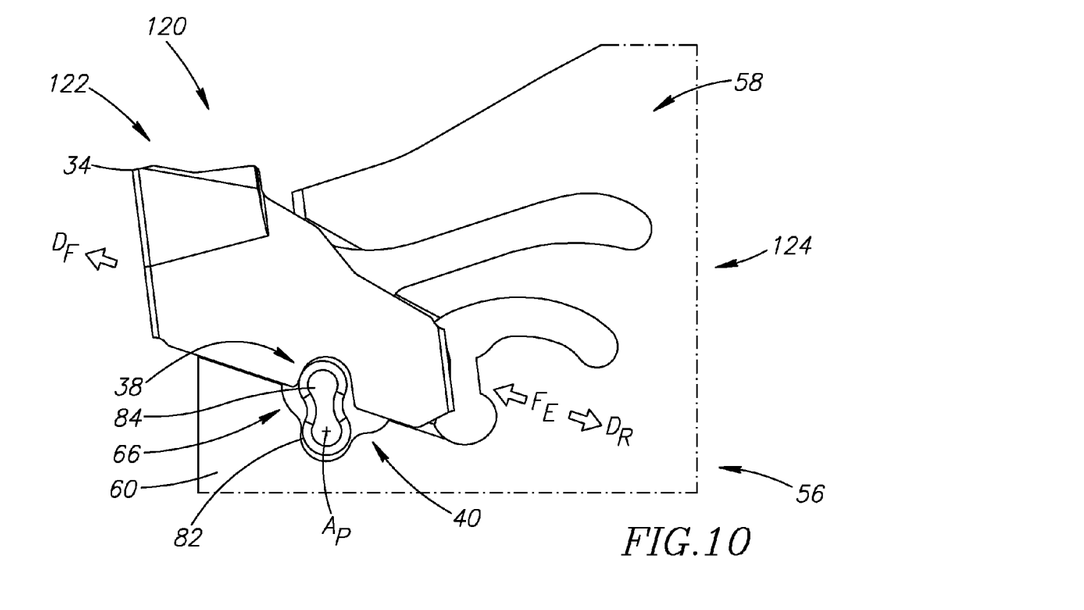
FIG. 10 is a side view of the cutting tool shown in FIG. 8 with the cutting insert located in a released position.

In accordance with some embodiments of the subject matter of the present application the pivot axis $A_P$ may be parallel to the holder and insert passage axes $A_H$, $A_I$. The step of rotating the extraction key 26 about the pivot axis $A_P$ may be performed until there is a resistive contact between the second engagement portion 84 and the base jaw lower surface 64 or the holder passage 66, preventing further rotation. In this position the cutting insert 22, 122 is said to be in the released position and the cutting insert 22, 122 is no longer resiliently clamped in the holding portion 58.

It should be noted that a feature of subject matter of the present application is that there is no requirement for a recess at the rear of the insert receiving slot 42 to accommodate the second engagement portion 84 of the extraction key 26 when extracting the cutting insert 22, 122 from the cutting tool 20, 120. The absence of the recess allows the clamping jaw upper surface 80 to have increased resilience with respect to the base jaw lower surface 64, thereby providing clamping forces of a greater magnitude.

Another feature of subject matter of the present application is that, when extracting the cutting insert 22, 122 from the cutting tool 20, 120 with the extraction key 26 and applying extraction force $F_E$ on the insert passage 38, the cutting insert 22, 122 can be ejected from the insert receiving slot 42 in a controlled manner. This is achieved since, when rotating the extraction key 26 in a forward direction $D_F$ in order to extract the cutting insert 22, 122, the second engagement portion 84 of the extraction key 26 comes into resistive contact with the base jaw lower surface 64 or the holder passage 66 (see FIGS. 6 and 8). This contact prevents the extraction key 26 being rotated further and occurs while the cutting insert 22, 122 is still partially located in the insert receiving slot 42. At this point, the extraction key 26 can be disengaged from the cutting tool 20, 120 so that the cutting insert 22, 122 can be completely removed from the holder blade 24, 124 in a controlled manner. If, for example, the extraction force $F_E$ is applied to an end surface of the cutting insert 22, 122 furthest from the operative cutting edge 34, the cutting insert 22, 122 would be liable to be fully displaced from the insert receiving slot 42. It such a scenario, for a double-ended cutting insert 22 for example, the tool operator may not know which cutting edge 34 has been used and which cutting edge 34 is unused.

Although the subject matter of the present application has been described to a certain degree of particularity, it should be understood that various alterations and modifications could be made without departing from the spirit or scope of the invention as hereinafter claimed.

What is claimed is:

1. A cutting tool (20, 120) comprising a holder blade (24, 124) and a cutting insert (22, 122) resiliently clamped in the holder blade (24, 124), the holder blade (24, 124) having a body portion (56) and a holding portion (58), the holding portion (58) having two opposing side surfaces (60) and comprising:

an insert receiving slot (42) opening out to a holder front end surface (62) of the holder blade (24, 124) and having a holder longitudinal axis (B) extending in a forward to rearward direction ($D_F$, $D_R$), and a holder passage (66) extending along a holder passage axis ($A_H$) and opening out to at least one of the two side surfaces (60), the holder passage axis ($A_H$) containing a holder passage centre point ($C_H$); wherein the insert receiving slot (42) has a base jaw lower surface (64) facing in an upward direction (U), the base jaw lower surface (64) including at least one longitudinally extending base jaw clamping portion (78), each base jaw clamping portion (78) containing a linear holder imaginary line ($L1_H$, $L2_H$) parallel to the holder longitudinal axis (B);

the holder passage centre point ($C_H$) is located downwardly from the base jaw lower surface (64);

the cutting insert (22, 122) has an insert longitudinal axis (A) parallel to the holder longitudinal axis (B) and comprises;

opposing insert upper and lower surfaces (28, 30) with a peripheral surface (32) extending therebetween and a cutting edge (34) associated with the insert upper surface (28), the peripheral surface (32) comprising two opposing lateral surfaces (36); and an insert passage (38) extending along an insert passage axis ($A_I$) and opening out to the opposing lateral surfaces (36), the insert passage axis ($A_I$) containing an insert passage centre point ($C_I$); wherein the insert lower surface (30) includes at least one longitudinally extending lower clamping portion (52), each lower clamping portion (52) containing a linear insert imaginary line ($L1_I$, $L2_I$) parallel to the insert longitudinal axis (A);

the at least one lower clamping portion (52) is in clamping contact with the at least one base jaw clamping portion (78) and the cutting insert (22, 122) is located in a rearmost position in the insert receiving slot (42) defining an assembled state;

a passage plane (P1) containing the holder passage axis ($A_H$) and the insert passage axis ($A_I$) forms a first angle ($\alpha$) with a main plane (P2) perpendicular to the insert longitudinal axis (A) and containing the insert passage axis ($A_I$); and the first angle ($\alpha$) is less than or equal to 60°.

2. The cutting tool (20, 120), according to claim 1; wherein the first angle ($\alpha$) is less than or equal to 30°.

3. The cutting tool (20, 120), according to claim 1; wherein the holder passage axis ($A_H$) is forward of the insert passage axis ($A_I$).

4. The cutting tool (20, 120), according to claim 1; wherein the holder passage (66) extends between, and opens out to, both side surfaces (60).

5. The cutting tool (20, 120), according to claim 1; wherein there is exactly one insert passage (38).

6. The cutting tool (20, 120), according to claim 1; wherein the holder passage (66) includes a holder curved portion (76) having a substantially constant radius subtending a holder passage angle ($\beta_H$);
the insert passage (38) includes an insert curved portion (54) having a substantially constant radius subtending an insert passage angle ($\beta_I$); and
both the holder and insert passage angles ($\beta_H$, $\beta_I$) are greater than 90°.

7. The cutting tool (20, 120), according to claim 1; wherein the base jaw lower surface (64) has two base jaw clamping portions (78); and
the two respective linear holder imaginary lines ($L1_H$, $L2_H$) are co-axial.

8. The cutting tool (20, 120), according to claim 1; wherein the insert passage (38) opens out to the insert lower surface (30) and has an insert passage upwardmost point (48).

9. The cutting tool (20, 120), according to claim 8; wherein a third plane (P3) that is coplanar with or parallel to the main plane (P2), contains the insert passage upwardmost point (48) and intersects the insert upper surface (28) at an intersection point (55) in a side view of the cutting insert; and
in a side view of the cutting tool (20, 120), measured in the third plane (P3), a passage height (h1) between the insert passage upwardmost point (48) and the downwardmost insert imaginary line ($L1_I$, $L2_I$) is at least one quarter the magnitude of an insert height (h2) between the intersection point (55) and the downwardmost insert imaginary line ($L1_I$, $L2_I$).

10. The cutting tool (20, 120), according to claim 1; wherein
the insert lower surface (30) has two lower clamping portions (52); and
the two respective linear insert imaginary lines ($L1_I$, $L2_I$) are co-axial.

11. The cutting tool (20, 120), according to claim 1; wherein
the insert receiving slot (42) has a clamping jaw upper surface (80) facing towards the base jaw lower surface (64).

12. The cutting tool (20, 120), according to claim 1; wherein
the insert passage (38) and the holder passage (66) are unoccupied.

13. The cutting tool (20, 120), according to claim 1; wherein
the insert passage (38) and the holder passage (66) are non-contiguous at an insert passage forwardmost point (44) and a holder passage forwardmost point (68).

14. The cutting tool (20), according to claim 1; wherein the cutting insert (22) exhibits minor symmetry about the main plane (P2).

15. The cutting tool (20), according to claim 1; wherein in a side view of the cutting tool (20), the holder passage (66) is circular.

16. The cutting tool (120), according to claim 8; wherein the holder passage (66) opens out to the base jaw lower surface (64).

17. The cutting tool (120), according to claim 1; wherein the main plane (P2) intersects the holder passage (66).

18. The cutting tool (120), according to claim 13; wherein the holder passage forwardmost point (68) is located forward of the insert passage forwardmost point (44).

19. A method of extracting a cutting insert (24, 124) from a cutting tool (20, 120) by means of an extraction key (26); wherein
the cutting tool (20, 120) is in accordance with claim 1;
the insert receiving slot (42) includes a clamping jaw upper surface (80) facing towards the base jaw lower surface (64);
the cutting insert (22, 122) is resiliently clamped between the clamping jaw upper surface (80) and the base jaw lower surface (64); and
the extraction key (26) has at least one protrusion (40), the at least one protrusion (40) including a first and a second engagement portion (82, 84) and a single pivot axis ($A_P$);
the method comprising the steps of:
positioning the extraction key (26) relative to the cutting tool (20, 120) such that the first and second engagement portions (82, 84) simultaneously engage the holder passage (66) and the insert passage (38), respectively, and the pivot axis ($A_P$) is located in the holder passage (66); and
rotating the extraction key (26) in one direction about the pivot axis ($A_P$) to apply an extraction force ($F_E$) on the cutting insert (22, 122) in the forward direction ($D_F$).

20. The method, according to claim 19; wherein
the pivot axis ($A_P$) is parallel to the holder and insert passage axes ($A_H$, $A_I$).

21. The method, according to claim 19; comprising
rotating the extraction key (26) about the pivot axis ($A_P$) until resistive contact between the second engagement portion (84) and the base jaw lower surface (64) or the holder passage (66) prevents further rotation.

22. The method, according to claim 19; comprising
rotating the extraction key (26) about the pivot axis ($A_P$) until the cutting insert (22, 122) is no longer resiliently clamped in the holding portion (58).

23. A cutting tool (20, 120) comprising a holder blade (24, 124) and a cutting insert (22, 122) resiliently clamped in the holder blade (24, 124), wherein:
the holder blade (24, 124) comprises a body portion (56) and a holding portion (58), the holding portion comprising:
two opposing side surfaces (60) and a holder front end surface (62);
an insert receiving slot (42) opening out to the holder front end surface (62), the insert receiving slot having a base jaw lower surface (64) including at least one longitudinally extending base jaw clamping portion (78); and
a holder passage (66) extending along a holder passage axis ($A_H$) and opening out to at least one of the two side surfaces (60), the holder passage axis ($A_H$) containing a holder passage centre point ($C_H$) which is below the base jaw lower surface (64) in a side view of the holder blade; and the cutting insert comprises:
- opposing insert upper and lower surfaces (28, 30) with a peripheral surface (32) extending therebetween and a cutting edge (34) associated with the insert upper surface (28), the peripheral surface (32) comprising two opposing lateral surfaces (36), the insert lower surface (30) including at least one longitudinally extending lower clamping portion (52); and
- an insert passage (38) extending along an insert passage axis ($A_I$) and opening out to the opposing lateral surfaces (36), the insert passage axis ($A_I$) containing an insert passage centre point ($C_I$);

the cutting insert (22, 122) is located in a rearmost position in the insert receiving slot (42);

the at least one lower clamping portion (52) is in clamping contact with the at least one base jaw clamping portion (78) defining an assembled state, whereby the cutting insert (22, 122) and the holder blade (24, 124) form an imaginary border line (LB), in a side view of the cutting tool (20, 120);

a passage plane (P1) containing the holder passage axis ($A_H$) and the insert passage axis ($A_I$) forms a first angle ($\alpha$) with a main plane (P2) containing the insert passage axis ($A_I$) and perpendicular to the imaginary border line (LB); and the first angle ($\alpha$) is less than or equal to 60°.

24. The cutting tool (20, 120) according to claim 23, wherein:
- the holder blade (24, 124) has a holder longitudinal axis (B) extending in a forward to rearward direction ($D_F$, $D_R$);
- the base jaw lower surface (64) of the insert receiving slot (42) faces in an upward direction (U);
- each base jaw clamping portion (78) contains a linear holder imaginary line ($L1_H$, $L2_H$) parallel to the holder longitudinal axis (B);
- the cutting insert (22, 122) has an insert longitudinal axis (A) parallel to the holder longitudinal axis (B);
- each lower clamping portion (52) of the cutting insert contains a linear insert imaginary line ($L1_I$, $L2_I$) parallel to the insert longitudinal axis (A).

25. The cutting tool (20, 120), according to claim 23; wherein
the insert passage (38) and the holder passage (66) are unoccupied.

26. The cutting tool (20, 120), according to claim 23; wherein
the insert receiving slot (42) has a clamping jaw upper surface (80) facing towards the base jaw lower surface (64).

* * * * *